(12) United States Patent
Ali-Vehmas (10) Patent No.: US 9,433,020 B2
(45) Date of Patent: Aug. 30, 2016

(54) GROUP USER EXPERIENCE (71) Applicant: Nokia Corporation, Espoo (FI)

(72) Inventor: Timo Ali-Vehmas, Kaunianen (FI)

(73) Assignee: Nokia Technologies Oy, Espoo (FI)

( * ) Notice: Subject to any disclaimer, the term of this patent is extended or adjusted under 35 U.S.C. 154(b) by 737 days.

(21) Appl. No.: 13/679,084

(22) Filed: Nov. 16, 2012

(65) Prior Publication Data

US 2013/0130733 A1 May 23, 2013

Related U.S. Application Data (63) Continuation-in-part of application No. 13/299,575, filed on Nov. 18, 2011, now abandoned.

(51) Int. Cl.
G06F 15/16 (2006.01)
H04W 76/02 (2009.01)
H04L 29/08 (2006.01)

(52) U.S. Cl.
CPC .............. *H04W 76/02* (2013.01); *H04L 29/08* (2013.01)

(58) Field of Classification Search
CPC ....................................................... H04L 29/08
USPC .................................................. 709/223, 224
See application file for complete search history.

(56) References Cited

U.S. PATENT DOCUMENTS

| 7,673,330 | B2 | 3/2010 | Bussard et al. ................ 726/7 |
| 7,720,037 | B2 | 5/2010 | Bill ............................... 370/338 |
| 8,199,003 | B2 | 6/2012 | Aaron ....................... 340/539.26 |
| 2005/0086273 | A1 | 4/2005 | Loebbert et al. ............. 707/204 |
| 2006/0089119 | A1 | 4/2006 | Lipasti et al. ................. 455/410 |
| 2006/0221915 | A1 | 10/2006 | Gatta et al. .................... 370/338 |
| 2008/0080397 | A1 | 4/2008 | Niranjan et al. .............. 370/254 |
| 2008/0154697 | A1 | 6/2008 | Guday et al. ................... 705/10 |
| 2010/0332305 | A1* | 12/2010 | Higgins et al. ............ 705/14.16 |
| 2011/0014897 | A1 | 1/2011 | Finucan ..................... 455/412.2 |
| 2012/0209910 | A1 | 8/2012 | Svendsen et al. ............ 709/204 |

OTHER PUBLICATIONS

Chandola, Varlin, et al., "Anomaly Detection: A Survey", ACM Computing Surveys, vol. 41, No. 3, Article 15, Jul. 2009, 58 pgs.
A.L. Barabasi et al.; "Evolution of the social network of scientific collaboration"; Apr. 10, 2001; whole document (14 pages).
S.H. Strogatz; "Exploring complex networks"; Nature, vol. 410; Mar. 8, 2001; pp. 268-276.

* cited by examiner

*Primary Examiner* — Adnan Mirza
(74) *Attorney, Agent, or Firm* — Harrington & Smith (57) ABSTRACT

Disclosed is a method, system and computer programs to provide emergent behavior in a network of connected mobile user devices. The method includes advertising with a mobile wireless communication device to other mobile wireless communication devices a vector list that includes at least mobile wireless communication device specific vectors and mobile wireless communication device user specific vectors. The method further includes determining, in cooperation with a cloud-based data processing environment, whether to connect to a network of other mobile wireless communication devices based at least on at least one element that comprises part of vector lists associated with the other mobile wireless communication devices, the vector lists being stored at the cloud-based data processing environment.

15 Claims, 4 Drawing Sheets

GROUP USER EXPERIENCE

CROSS-REFERENCE TO RELATED APPLICATIONS

This application is a continuation-in-part of U.S. patent application Ser. No. 13/299,575, filed on Nov. 18, 2011, the disclosure of which is hereby incorporated by reference in its entirety.

TECHNICAL FIELD

The exemplary and non-limiting embodiments of this invention relate generally to user devices having communication capability such as those used in wireless communication systems, methods, devices and computer programs and, more specifically, relate to cloud-based distributed and fractal decision making, protocols and concepts for facilitating emergent user behaviors.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Truly emergent end devices (e.g., phones, pads, sensors, actuators and machines in general) are not yet available to the general public. Emergent software (SW) solutions in the context of online social networks are expected to become at least somewhat available in the near future. Emergent behavior is at present the most advanced in game SW and in certain scientific and industrial applications, such as in dedicated pattern detection algorithms.

SUMMARY

In a first aspect thereof the exemplary embodiments of this invention provide a method that comprises advertising with a mobile wireless communication device to other mobile wireless communication devices a vector list comprising at least mobile wireless communication device specific vectors and mobile wireless communication device user specific vectors; and determining, in cooperation with a cloud-based data processing environment, whether to connect to a network of other mobile wireless communication devices based at least on at least one element that comprises part of vector lists associated with the other mobile wireless communication devices, the vector lists being stored at the cloud-based data processing environment.

In another aspect thereof the exemplary embodiments of this invention provide an apparatus that comprises at least one data processor and at least one memory including computer program code. The at least one memory and computer program code are configured, with the at least one data processor, to cause the apparatus at least to advertise with a mobile wireless communication device to other mobile wireless communication devices a vector list comprising at least mobile wireless communication device specific vectors and mobile wireless communication device user specific vectors; and to determine, in cooperation with a cloud-based data processing environment, whether to connect to a network of other mobile wireless communication devices based at least on at least one element that comprises part of vector lists associated with the other mobile wireless communication devices, the vector lists being stored at the cloud-based data processing environment.

In still another aspect thereof the exemplary embodiments of this invention provide a method that comprises receiving at a cloud based data processing environment from individual ones of a plurality of mobile wireless communication devices a vector list advertised by each of the mobile wireless communication devices, the vector list comprising at least mobile wireless communication device specific vectors and mobile wireless communication device user specific vectors. The method further includes storing the vector lists at the cloud based data processing environment. The method further includes executing a connection preference algorithm with a particular one of the mobile wireless communication devices to determine whether to connect to a network of other mobile wireless communication devices based at least on at least one element that comprises part of the stored vector lists associated with the other mobile wireless communication devices.

In yet one more aspect thereof the exemplary embodiments of this invention provide an apparatus that comprises at least one data processor and at least one memory that includes computer program code. The at least one memory and computer program code are configured, with the at least one data processor, to cause the apparatus at least to receive at a cloud based data processing environment from individual ones of a plurality of mobile wireless communication devices a vector list advertised by each of the mobile wireless communication devices. The vector list comprises at least mobile wireless communication device specific vectors and mobile wireless communication device user specific vectors. The at least one memory and computer program code are configured, with the at least one data processor, to further cause the apparatus to store the vector lists at the cloud based data processing environment, and to execute a connection preference algorithm with a particular one of the mobile wireless communication devices to determine whether to connect to a network of other mobile wireless communication devices based at least on at least one element that comprises part of the stored vector lists associated with the other mobile wireless communication devices.

A further exemplary embodiment is a method that includes: advertising with a mobile wireless communication device to other mobile wireless communication devices a vector list comprising at least mobile wireless communication device specific vectors, mobile wireless communication device user specific vectors, and one or more cost factor vectors corresponding to one or more costs that would occur in response to the mobile wireless communication device connecting to a network of other mobile wireless communication devices; and determining, in cooperation with a cloud-based data processing environment, whether to connect to a network of the other mobile wireless communication devices based at least on at least one element that comprises part of vector lists associated with the other mobile wireless communication devices, the vector lists being stored at the cloud-based data processing environment.

An additional exemplary embodiment is an apparatus including at least one data processor and at least one memory including computer program code, where the at least one memory and computer program code are configured, with the at least one data processor, to cause the apparatus at least to perform: advertising with a mobile wireless communication device to other mobile wireless communication devices a vector list comprising at least mobile wireless communication device specific vectors, mobile wireless communication device user specific vectors, and one or more cost factor vectors corresponding to one or more costs that would occur in response to the mobile wireless communication device connecting to a network of other mobile wireless communication devices; and determining, in cooperation with a cloud-based data processing environment, whether to connect to a network of the other mobile wireless communication devices based at least on at least one element that comprises part of vector lists associated with the other mobile wireless communication devices, the vector lists being stored at the cloud-based data processing environment.

Yet another exemplary embodiment is a computer program product comprising a computer-readable storage medium bearing computer program code embodied therein for use with a computer, the computer program code comprising code for performing: advertising with a mobile wireless communication device to other mobile wireless communication devices a vector list comprising at least mobile wireless communication device specific vectors, mobile wireless communication device user specific vectors, and one or more cost factor vectors corresponding to one or more costs that would occur in response to the mobile wireless communication device connecting to a network of other mobile wireless communication devices; and determining, in cooperation with a cloud-based data processing environment, whether to connect to a network of the other mobile wireless communication devices based at least on at least one element that comprises part of vector lists associated with the other mobile wireless communication devices, the vector lists being stored at the cloud-based data processing environment.

In a further exemplary embodiment, an apparatus includes: means for advertising with a mobile wireless communication device to other mobile wireless communication devices a vector list comprising at least mobile wireless communication device specific vectors, mobile wireless communication device user specific vectors, and one or more cost factor vectors corresponding to one or more costs that would occur in response to the mobile wireless communication device connecting to a network of other mobile wireless communication devices; and means for determining, in cooperation with a cloud-based data processing environment, whether to connect to a network of the other mobile wireless communication devices based at least on at least one element that comprises part of vector lists associated with the other mobile wireless communication devices, the vector lists being stored at the cloud-based data processing environment.

A further exemplary method includes: receiving at a cloud based data processing environment from individual ones of a plurality of mobile wireless communication devices a vector list advertised by each of the mobile wireless communication devices, the vector list comprising at least mobile wireless communication device specific vectors, mobile wireless communication device user specific vectors, and one or more cost factors corresponding to one or more costs that would occur in response to the mobile wireless communication device connecting to a network of other mobile wireless communication devices; storing the vector lists at the cloud based data processing environment; and executing a connection preference algorithm with a particular one of the mobile wireless communication devices to determine whether to connect to a network of other mobile wireless communication devices based at least on at least one element that comprises part of the stored vector lists associated with the other mobile wireless communication devices.

In an additional exemplary embodiment, an apparatus includes: means for receiving at a cloud based data processing environment from individual ones of a plurality of mobile wireless communication devices a vector list advertised by each of the mobile wireless communication devices, the vector list comprising at least mobile wireless communication device specific vectors, mobile wireless communication device user specific vectors, and one or more cost factors corresponding to one or more costs that would occur in response to the mobile wireless communication device connecting to a network of other mobile wireless communication devices; means for storing the vector lists at the cloud based data processing environment; and means for executing a connection preference algorithm with a particular one of the mobile wireless communication devices to determine whether to connect to a network of other mobile wireless communication devices based at least on at least one element that comprises part of the stored vector lists associated with the other mobile wireless communication devices.

An exemplary apparatus includes at least one processor and at least one memory including computer program code. The at least one memory and the computer program code are configured to, with the at least one processor, cause the apparatus to perform at least the following: receiving at a cloud based data processing environment from individual ones of a plurality of mobile wireless communication devices a vector list advertised by each of the mobile wireless communication devices, the vector list comprising at least mobile wireless communication device specific vectors, mobile wireless communication device user specific vectors, and one or more cost factors corresponding to one or more costs that would occur in response to the mobile wireless communication device connecting to a network of other mobile wireless communication devices; storing the vector lists at the cloud based data processing environment; and executing a connection preference algorithm with a particular one of the mobile wireless communication devices to determine whether to connect to a network of other mobile wireless communication devices based at least on at least one element that comprises part of the stored vector lists associated with the other mobile wireless communication devices.

An exemplary computer program product includes a computer-readable medium bearing computer program code embodied therein for use with a computer, the computer program code including: code for receiving at a cloud based data processing environment from individual ones of a plurality of mobile wireless communication devices a vector list advertised by each of the mobile wireless communication devices, the vector list comprising at least mobile wireless communication device specific vectors, mobile wireless communication device user specific vectors, and one or more cost factors corresponding to one or more costs that would occur in response to the mobile wireless communication device connecting to a network of other mobile wireless communication devices; code for storing the vector lists at the cloud based data processing environment; and code for executing a connection preference algorithm with a particular one of the mobile wireless communication devices to determine whether to connect to a network of other mobile wireless communication devices based at least on at least one element that comprises part of the stored vector lists associated with the other mobile wireless communication devices.

DETAILED DESCRIPTION

As was noted above, the exemplary embodiments of this invention relate to cloud-based distributed and fractal decision making, protocols and concepts for facilitating emergent user behaviors. The services implemented in this manner can be associated with a number of different technical fields including as a non-limiting example, cognitive radio and the making of spectrum decisions for cognitive radio devices.

Presently the social behavior of people is supported by mobile communication technologies and user devices only in a limited fashion. The traditional end user experience is optimized only from a single device perspective. This is natural outgrowth of the conventional limited bandwidth available to telecommunication and internet network operators, as well as to offline constraints and a lack of predictability of cooperation between user devices and supporting network functionalities. However, new network technologies, both in the wide area network (WAN) and the local area network (LAN) arenas, are rapidly developing towards an ability to provide ubiquitous connectivity and low delay transport. These advances enable new ways to make decisions on behalf of the users (devices) in order to bring emergence as a value to the consumers.

Conventional group decision methods have been very limited, typically dictated by the network access nodes, e.g., base stations, or core network functionalities in the case of the use of spectrum or the use of a certain service provider. These functionalities have been fully centrality governed based on, for example, a subscription provider's rights such as provided by SIM cards rather than the desires of the users.

In the LAN sense group decision methods have been even more restricted to dedicated local sensors, accessories and other similar devices associated with some master unit. Sharing of the capacity, information or other characteristics of the sensors and actuators have been very limited. As Machine to Machine (M2M) traffic evolves new concepts will emerge in the local domain such as in the home, vehicle, school, etc.

The exemplary embodiments of this invention define concepts and basic protocols to enable (centralized or distributed) cloud-based emergent behaviors in mobile devices. As opposed to a fully centralized, fully controlled group decision making capability the exemplary embodiments enable and facilitate the natural social behavior of persons by emergent group decision making. The exemplary embodiments provide a definition of basic information elements and the principles of protocols between clouds and user devices, as well as a definition of the principles of emergent behavior in a mobile space. Preferential attachment as a concept in emerging networks is implemented in the case of a group user interface.

Before describing in further detail the technical underpinnings of the exemplary embodiments of this invention it may prove useful to discuss the concepts of emergent behavior in the context of this invention. The concept of emergent behavior is often used in the context of complex adaptive systems, where some not-predictable but not fully random behaviors can be observed. A related concept is known as a Strange Attractor system.

There are certain underlying structures which can make these types of behaviors emerge. An aspect of this invention is in providing a framework for mobile user devices in order to implement these behaviors while, at the same time, ensuring that a network of such devices operates in a stable manner.

In practice this implies in the context of mobile devices that certain behaviors become manifested. One such behavior involves implementing a group of self-organized mobile devices (using the basic algorithms described below). As one non-limiting example, the mobile devices can individually recognize that there is some (large) number of devices (and their owners/users) in the same space at the same time in order to take advantage of some events they may or may not be aware of. As an example, assume that there is a group or emergent network of people close to an event which, based on the correlation or compatibility of their vectors in the vector list, should be interesting to many of them. The ad hoc networking can go even further by connecting the group to the information that there is a group discount for this venue available, e.g., to obtain discount tickets for a show or a concert by purchasing a group ticket rather than individual tickets. This type of self organization is made possible when the devices build their own (typically transitory) social network based on certain "vectors" as well as assistance from a "cloud" where, among other information and data, information concerning sale offers for some event at some certain location and time can be listed.

A further aspect of this invention is to provide an underlying capability of user devices to spontaneously and automatically form social groups with similar or aligned preferences.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats.

Although various embodiments of this invention are described below with respect to clouds, it is contemplated that the approach described herein may be used with other structures and conceptual description methods used to create distributed models of information and computations.

In one embodiment, according to a definition by the National Institute of Standards and Technology (NIST), cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models, and four deployment models. The essential characteristics of the cloud model consist of on-demand self-service, broad network access, resource pooling, rapid elasticity, and measured Service.

The on-demand self-service characteristic of the cloud model enables a consumer to unilaterally provision computing capabilities, such as server time and network storage, as needed automatically without requiring human interaction with each service's provider.

The broad network access characteristic of the cloud model provides capabilities available over the network that can be accessed through standard mechanisms that promote use by heterogeneous thin or thick client platforms (e.g., mobile phones, laptops, and PDAs).

Based on the resource pooling characteristic of the cloud model, the provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

The rapid elasticity of the cloud model provides rapid and elastic, and in some cases automatic, provision of capabilities to quickly scale out and rapid release to quickly scale in. To the consumer, the capabilities available for provisioning often appear to be unlimited and can be obtained in any quantity at any time.

According to the measured service characteristic, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Furthermore, the service models associated with the cloud model include Cloud Software as a Service (SaaS), Cloud Platform as a Service (PaaS), and Cloud Infrastructure as a Service (IaaS).

The Cloud Software as a Service (SaaS) provides, to the customer, the capability to use the provider's applications running on a cloud infrastructure. The applications are accessible from various client devices through a thin client interface such as a web browser (e.g., web-based email). According to this service model, the consumer does not manage or control the underlying cloud infrastructure including network, servers, operating systems, storage, or even individual application capabilities, with the possible exception of limited user-specific application configuration settings.

The Cloud Platform as a Service (PaaS) provides, to the customer, the capability to deploy onto the cloud infrastructure consumer-created or acquired applications created using programming languages and tools supported by the provider. According to this service model, the consumer does not manage or control the underlying cloud infrastructure including network, servers, operating systems, or storage, but has control over the deployed applications and possibly application hosting environment configurations.

The Cloud Infrastructure as a Service (IaaS) provides, to the consumer, the capability to provision processing, storage, networks, and other fundamental computing resources where the consumer is able to deploy and run arbitrary software, which can include operating systems and applications. According to this service model, the consumer does not manage or control the underlying cloud infrastructure but has control over operating systems, storage, deployed applications, and possibly limited control of select networking components (e.g., host firewalls).

Additionally, a cloud model can be deployed as a private cloud, a community cloud, a public cloud, or a hybrid cloud. According to the private cloud model, the cloud infrastructure is operated solely for an organization. It may be managed by the organization or a third party and may exist on premise or off premise. Alternatively, a community cloud infrastructure is shared by several organizations and supports a specific community that has shared concerns (e.g., mission, security requirements, policy, and compliance considerations). It may be managed by the organizations or a third party and may exist on premise or off premise. A public cloud infrastructure is made available to the general public or a large industry group and is owned by an organization selling cloud services. Finally, a hybrid cloud infrastructure is a composition of two or more clouds (private, community, or public) that remain unique entities but are bound together by standardized or proprietary technology that enables data and application portability (e.g., cloud bursting for load-balancing between clouds).

Figure 1:
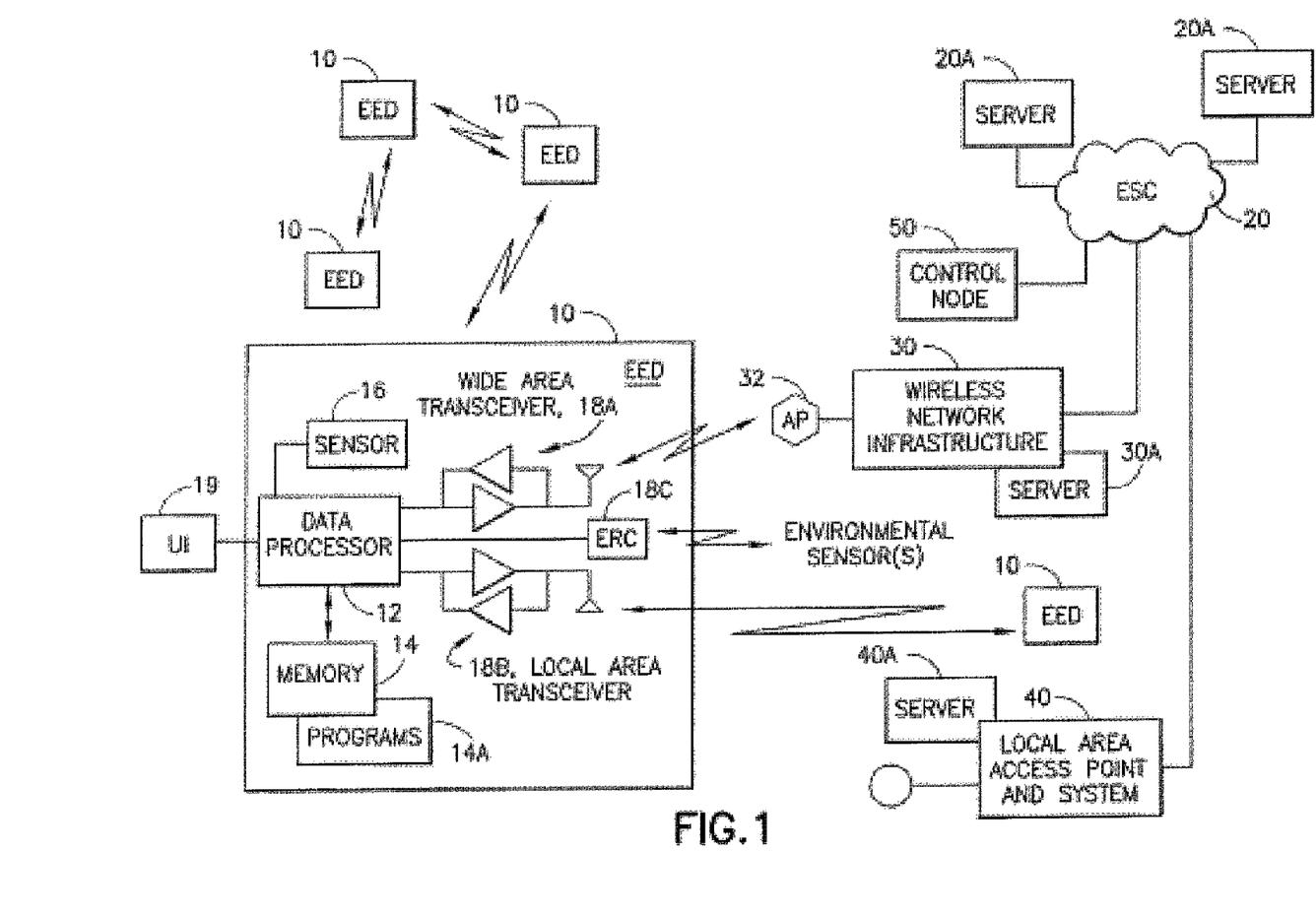
FIG. 1 is a simplified block diagram of a mobile device configured to support emergent behavior as an Emergence Enabled Device and an Emergence Supporting Cloud.

FIG. 1 is a simplified block diagram of a mobile device (MD) configured to support emergent behavior. The mobile device can be referred to herein without a loss of generality as an Emergence Enabled Device (EED) 10, while noting that the emergence per se is a group function of a population of EEDs 10, as well as data and computational algorithms resident in a cloud (the cloud may in actuality comprise two or more clouds of the same or differing types).

For the purpose of describing the exemplary embodiments of this invention there can be defined an Emergence Supporting Cloud (ESC) 20. In practice the ESC 20 can be composed of one or more entities located in a core wireless network as a server 30A, and/or the ESC 20 can be implemented as two or more geographically distributed servers 20A, and/or the ESC 20 can be implemented as a server or as distributed servers in the EEDs 10. For example, a particular mobile device can be at the same time one of the population of EEDs 10 and an ESC 20 for local area EEDs. In general the ESC 20 can be considered to represent a cloud-based data processing environment that is usable by the EED 10 to at least make network connection, disconnection and other decisions affecting the functioning of the EED 10 in the emergent network of EEDs 10.

In practical applications often the above mentioned hybrid cloud scenario is very likely because the EEDs 10 initially may be subscribers of different public and private clouds but, in the emerging network case, they are allowed to temporarily connect to the ESC 20 that is dedicated for emergent services. When emergent services and applications are the main stream of the service paradigm the ESC 20 functionalities can be assumed to be a standard functionality of all clouds, which can be defined as a meta cloud or as an Emergence as a Service (EaaS).

For the purpose of describing the exemplary embodiments of this invention the EED 10 can be assumed to include at least one data processor 12 connected with at least one memory 14 that stores data and programs 14A that are executable by the data processor 12 to control the overall operation of the EED 10, including the emergent behavior aspects thereof. The EED 10 can also include at least one sensor 16 such as a location sensor (e.g., a GPS subsystem) and a time sensor (e.g., a calendar/clock subsystem). Other sensors 16 of interest can include, but are not limited to, one or more of an orientation sensor (e.g. a gyroscope), an acceleration sensor (e.g., an accelerometer), a temperature sensor and any other types of sensors suitable for making the EED 10 cognizant of its environment.

It can be noted that other embedded radio capabilities (ERC) 18C of the EED 10, such as a near field communication (NFC) transceiver, Bluetooth (a proprietary open wireless technology standard for exchanging data over short distances), Zigbee (a specification for a suite of high level communication protocols using small, low-power digital radios based on an IEEE 802 standard for personal area networks), or any other local or wide area radio equipment may be used to gather environmental information. This environmental information can be based on, for example, neighboring measurements, observed reflections of radio signals, embedded identity information such as the service set identifier (SSID) and medium access control (MAC) identities, and others, to recognize the location and environmental factors which may be used to find better correlations of the preference vectors. In some embodiments the ERC 18C can be part of the transceivers 18A and or 18B, while in other embodiments the ERC 18C can be provided separately from the communication transceivers 18A and or 18B (e.g., a RFID interface). In the future it can be expected that the emergent devices will be provided with additional support from external tags or pilot transmitters, which may be considered as traffic signals for the EED 10s in their cognitive process of building the vectors in the vector list. NFC tags can be considered as an early example of such traffic signs.

The ERC 18C of the EED 10 can also be used to query and receive, or simply receive, information from one or more different types of sensors embedded in the environment of the EED 10. These embedded sensors could include, for example, a location-defining sensor, a temperature sensor, a sensor associated with a battery recharging station or port, an in-vehicle speed/acceleration sensor, an acoustic sensor having an output indicative of, for example, a background noise level, and/or a light sensor having an output indicative of, for example, a background illumination level, etc. In some embodiments the ERC 18C could be embodied at least partially in an image capture device (e.g., a digital camera subsystem) of the FED 10, coupled with image processing and recognition software located in the EED 10 or in, for example, the ESC 20.

It can be noted that a principal idea of EEDs 10 collecting various types of information is important, as is having a process where this information is somehow structured to be usable in the vectors. Truly emergent behavior employs some additional process or processes (e.g., reference can be made to schematic web basics). The embodiments of this invention are not limited by any semantic web requirement or by needing to provide an external powerful computing process. In this invention there are employed basic mechanisms to use either of these approaches or a hybrid approach. In general, emergence has not actually occurred in the internet for at least the reasons that web pages are too passive and search engines are too external, and thus the basic conditions for emergence have not been fulfilled. In the mobile space it becomes possible to implement truly emergent behavior because the EEDs 10 are active and their environment is constantly changing. As a result they need to adapt to external challenges continuously, which is not the case for traditional, or even active web pages.

Still referring to FIG. 1, a user interface (UI) 19 can be implemented with, for example, a touch screen type of user display/data entry subsystem. Other UI technologies, including auditory (e.g., speech synthesis/speech recognition) and/or tactile technologies, can also be used if desired.

In order to enable communication to occur with other EEDs 10 and with the ESC 20 there can be at least one and preferably two or more transmitter/receiver (transceiver) pairs 18A, 18B having associated radio frequency circuitry and baseband circuitry as is well know. For example there can be a wide area transceiver 18A such as one configured to enable wireless communication with one or more cellular networks via an access point 32 (e.g., a base station) and wireless network infrastructure 30. If used the cellular network can be any type of network, including GSM and LTE as two non-limiting examples. LTE, which has a very low round trip delay, provides especially attractive bearers.

The ESC 20 server mentioned above associated with a core network can be embodied in the server 30A that forms a part of the wireless network infrastructure 30. The wireless network infrastructure 30 can enable bidirectional communication between the EED 10 and the ESC 20 via one or more data communication networks such as the Internet.

Further by example, there can be a local area transceiver 18B such as one configured to enable wireless communication with other EEDs 10 either directly (point-to-point) or via a local area access point and system 40 (e.g. WLAN router/WLAN hotspot base station, etc.). The multi-radio ESC 10 can also operate as the physical mobile router, e.g., connecting the devices having only the local area transceiver 18B to the wide area network. As non-limiting examples the local area transceiver 18B could be compliant with Bluetooth™ standards and/or wireless LAN standards such as IEEE 802 and the like. Access to the ESC 20 can also be made via the local area access point and system 40 if present. Note that the ESC 20 can be embodied in whole or in part in at least one server 40A associated with the local area access point and system 40. The EED 10 can also include other embedded radio capabilities such as those mentioned above.

In general any radio protocol such as Bluetooth™ or WLAN (e.g., Wi-Fi) may be used as the radio bearer, as well as even more traditional access technologies. The exemplary embodiments can use any suitable radio protocol(s) to establish the novel network layer (a network of EEDs 10) on top of the basic access layer.

A population of EEDs 10 is shown in FIG. 1, meaning more than one EED 10. The population of EEDs 10 may be considered to form a network or a group of EEDs 10 interconnected to some degree via wireless links (radio frequency links and/or optical (e.g., IR) links). Each EED 10 can be associated with a different user. Each of the EEDs 10 could be identically constructed although in practice at least some can be provided by different manufacturers/vendors. For the purposes of this invention it can be assumed that each EED 10, whatever the overall architecture and type of EED, contains or has access to at least the basic computing functionality, data/program storage functionality and wireless communication functionality to operate in accordance with the exemplary embodiments of this invention.

Individual ones of the population of EEDs 10 could be implemented as phones, such as smartphones, or as computing devices such as laptop, tablet or notebook computing devices, or as personal digital assistants (PDAs), or as electronic readers, or as any type of portable user device enabling wireless communication and that contains a user interface enabling some type of visual/auditory/tactile interaction with the user of the device.

The emergent social behavior of the multiple Emergence Enabled Devices (EEDs) 10 can enable new connections to be made to closest detected nodes that are already connected and which have the greatest number of existing connections among detected nodes. This defines a first element of the concept as well as the protocol element 'connectivity'. Connectivity can be considered herein as a number (or a more complex value) of the connections and routes each connected EED 10 can provide to a new EED 10 seeking to join the network. It is useful also to consider the first and possibly also the second derivative of such characteristics, i.e., the speed of establishing new connections and/or breaking down existing connections, as well as the acceleration of the function.

Other characteristics of the EED 10 can be time dependent and are fundamentally important in the buildup of the emergent network of EEDs 10 as well as in the emergence of the new behaviors themselves. Hence the need to manage the derivatives is also important.

These include (as examples) EED 10 specific vectors. These vectors can include, as non-limiting examples, one or more of: a Location Vector (geographical 3 D location), with derivatives such as speed, acceleration and direction; a Time Vector (e.g., global vs. local time with intentions to move to a new time zone); a Channel(s) Vector (current communication frequencies and/or other communication related parameters such as spreading codes and connections); a Device Vector to define the characteristics of the EED 10, such as display size and type, operating system (including version number), memory capacity, hardware (HW) performance such as processor speed and whether the processor is implemented with a single core or multiple core architecture, manufacturer of the EED, etc.; and an Applications Vector to define supported applications in the EED 10.

There are also end user specific vectors which are attached to the EED 10 and implemented and supported by the EED 10 and the ESC 20. These vectors can include, as non-limiting examples, one or more of: a Privacy Vector (e.g., specifying four levels of privacy: Open, Social, Commercial, Governmental); A Security Vector (e.g., specifying four levels of security: Open, Social, Commercial, Governmental); an Affiliation Vector (e.g., specifying four levels of lists of affiliations: Random, Social, Commercial, Governmental); and a Personality Vector (e.g., the character of the end user, which can be assigned to one or more EEDs 10).

Note that in the above-described Affiliation Vector list there can be more than one affiliation. For example, the Social Affiliation Vector may include affiliations for family, co-workers, social networks, loyalty programs, etc., while the Commercial Affiliation Vector may include banks, commercial service agreements, etc. The Governmental Affiliation Vector can include governmental identifiers such as social security number, driver's license number and/or passport number. There can be several such identities if several governmental relationships, such as multiple passports, are included.

These and other types of vectors can be used to detect patterns in the behaviors of the end users and their associated devices (EEDs 10).

Each vector can also have vector characteristics defined to inform the network/cloud (e.g., the ESC 20) of the need to keep information updated. As an example, four levels of time invariance information may be used: fully static (no update); EED-initiated update; an update related to a change of semi-permanent information; and a transactional update (an update made when there is a transaction taking place, real time).

In addition to the foregoing vectors an Identity of the EED 10 is defined. Note that each EED 10 can have several different sub-layers and associated identities depending on the type of social behaviors enabled. The Identity vector can be assumed to be any value that can be used to uniquely identify the EED 10, such as an electronic serial number or a mobile identification number (MIN), as non-limiting examples.

The above-mentioned Preferential attachment can be implemented using an algorithm (a Preference algorithm 60 described below) that determines a level of preference or desire for the EED 10 to join a group of similar EEDs 10 and their supporting ESC(s) 20. In some situations more than one EED network may be desirable. One aspect of this invention is to enable the user to define the level of preference to join a group of similar EEDs 10 and their supporting ESC(s) 20.

Another aspect of this invention is to use a determined level of preference (determined by the user and/or automatically by the ESC 20) as an additional end user vector (a Preference Vector) to join to a group of EEDs 10, where all members of the group of EEDs 10 prefer a similar level of parallel group end user experience and interests. This can be ascertained at least in part from one or more of the vectors associated with the users of the other EEDs.

The end user experience includes, but need not be limited to, those elements that are shown or otherwise made manifest to the user of the EED 10. These can be, for example, audio signals from a speaker of the EED 10, video signals shown on a display of the EED 10, tactile signals, or whatever means there may be in the EED 10, and combinations of these, which can be used to inform (or entertain) the end user based on new, emerging opportunities that the EED 10 and ESC 20 separately or jointly are offering to the end user. Typically the emerging opportunities are offered to all of the users in the same EED group or network, or network branch, or group of groups (network of networks) of the EEDs 10, where some information or service may be relevant.

The end user preferences can change as a function of time, place and other factors, therefore the values of at least some of the preference-related vectors can change as well. The end user may wish to set at least some vector values manually and to adjust the values manually. Alternatively, or in combination with manual setting, a machine learning type of algorithm can make adjustments to vector values based on user behavior over some period of time.

One user preference adjustment algorithm can be based on the activity of the end user in each EED network of which the user is a member. For example, if there is no or little activity by the user in a certain EED network the preferential attachment value can be reduced for that EED network (or type of network) and the related vectors will have a lower value (a lower weight) in the overall preferential calculation.

The emerging functionality of the EEDs 10 of a particular EED network will normally be visible to the end users by simple observation, as well by correlating events that other group members initiate or react to. As a simple example, and as was noted above, if the user enters a movie theater and is notified by his or her EED 10 that a discounted group ticket may be available to the user for a screening of an action/adventure film, the user can be made cognizant that his or her EED 10 has been connected into a network of EEDs 10 associated with at least one ESC 20, and that other users in the vicinity of the movie theater have also explicitly expressed and/or previously exhibited a preference for action/adventure films.

As another example, EEDs 10 can be provided with a functionality that they actively indicate to the end user when there seems to be a successful emergent service implemented. In this case, when the EEDs 10 or the supporting ESC 20 recognize that now most of the emergent devices seem to be in the same movie theater they could indicate to the end user that the user has just participated in an emergent service and prompt the user for the user's reaction. For example, the end user could be prompted for whether the user enjoyed the emergent service and, if the end user responds affirmatively, then there is provided a learning possibility for an emergent machine learning type of algorithm. As described later, the user's feedback can be entered using "Like" and "Dislike" keys, as one non-limiting example.

An aspect of this invention is the operation of background algorithmic processing (e.g., in the ESC 20) that automatically determines an EED network or networks (group or groups) to attach the EED 10 to and thereby to automatically affiliate the user of the EED 10 with one or more other users of other EEDs 10. A related aspect involves the automatic dynamic behavior when leaving a group when the group (network of EEDs 10) is determined to not be currently relevant to the user.

A hysteresis parameter or function can be used to limit toggling between joining and leaving groups of EEDs 10. If used the hysteresis parameter preferably does not limit re-joining of a group and therefore the hysteresis functionality can include a timer to remove or reduce the hysteresis parameter over time.

In certain embodiments of this invention the end user experience is based at least in part on the group of EEDs 10 that the user's EED 10 has automatically attached to. However, the end user experience can also be based on a group comprised of groups of EEDs 10. This can occur, for example, when there is similar behavior between two or more groups of EEDs 10. In this case one group can make a group level preferential attachment to the other group or groups thereby exhibiting and exploiting the fractal nature of the system. Nested groups can be supported by the same algorithms as the individual node level attachments.

In order to enable the preferential attachment to occur the EED 10 broadcasts (e.g., advertises) its preferential vectors as well as a current capability to operate as a connection point to another EED searching for the first connection. Once the first connection is made between the EEDs 10 it can be preferred that the EED 10 having the more powerful network of connections and matching preferential vectors will act as the master of the particular set of connected EEDs 10 (i.e., acts as the EED group master). Any EED 10 can, at any given time, operate as a group master towards the less-connected devices and as a slave or client towards the more-connected EEDs. At least the above-described Device Vector, that defines the characteristics of the EED 10, and possibly also the Applications Vector may also be considered when determining which EED 10 is to be the group master.

For enhanced operation an image 70 (shown in FIG. 2) of the network may be stored in the cloud to provide enhanced emergent functionalities and also to protect the network of EEDs 10 in the event of a network 'crash'. The cloud can also provide a back copy option for the distributed network of master and slave EEDs in order to (at least partially) re-establish a group or network of EEDs in the event that a particular group or network of EEDs has ceased to exist for any particular reason.

It is not required, and may not be generally desirable, that all EEDs 10 of a group be connected to all other EEDs 10 of the group. The resulting fully connected topography can create a network that is too strongly connected resulting in the evolution capability of such a group to be inhibited.

As a part of the functioning of an EED 10 connection/disconnection algorithm 70 (shown in FIG. 2), when a particular EED 10 determines that there is no (or a low) compelling reason to remain connected to the EED network it can autonomously disconnect from the network. As a non-limiting example, a consideration of the battery power and the HW/SW resources required for a particular EED to remain in a particular EED network can we weighed against the benefit or potential benefit obtained from being a member of the EED network.

Figure 2:
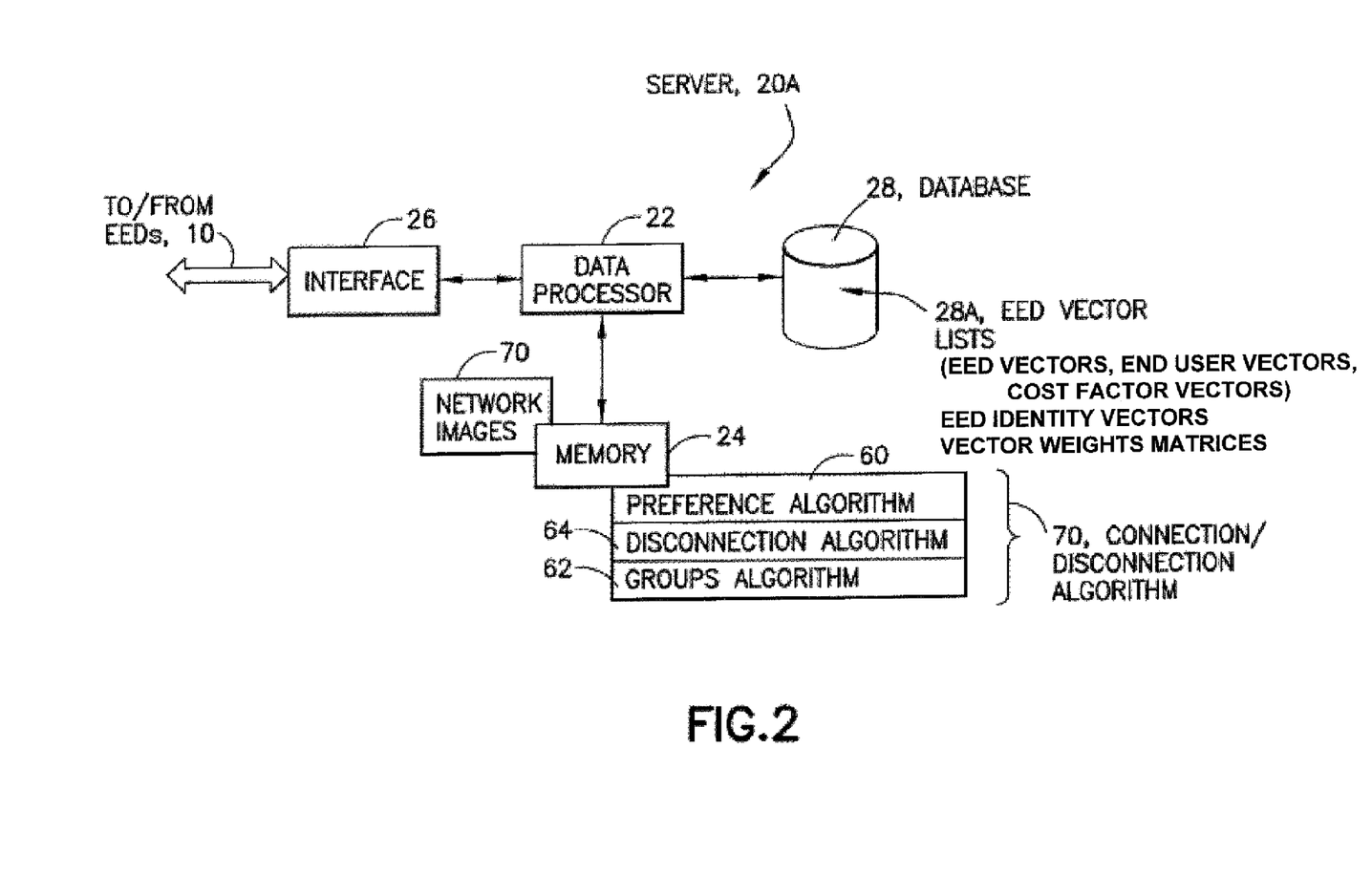
FIG. 2 shows an example of a portion of the Emergence Supporting Cloud and one of the servers shown in FIG. 1.

Also as a part of the functioning of the connection/disconnection algorithm 70 there can be a parameter that is considered in order to keep a strongly connected EED 10 (e.g., one having some number of connections to other EEDs that exceeds a threshold number) from too readily disconnecting from the network of EEDs. That is, a feature of the connection/disconnection algorithm 70 is an ability or at least a bias to inhibit, at least for a period of time, a strongly connected EED 10 from disconnecting from a particular network (or a group of networks) of EEDs. Graceful degradation of the network of EEDs 10 enables the slave EEDs to seek a new master within the same network and in this way avoid an unpredictable crash of the emergent network that could possibly occur if a current master EED abruptly disconnected. In the event such a crash still occurs, and as was noted above, the cloud may provide a backup solution for the remaining devices to re-establish the network with minimum delay, such as by providing the EED network image 70 (e.g., at least the identities of those EEDs 10 who were members of the group) at the time of the crash. In the event this is not possible for any reason the EED network can still be re-built from scratch, but typically with more time and effort being required.

In order to minimize power consumption in the network all of the EEDs 10 can be provisioned with a timer that protects the network from overload.

The exemplary embodiments of this invention can be used to construct ad hoc networks for Cognitive Radio systems in those cases where close connection between an application and the radio connectivity is beneficial. The radios optimize their spectrum utilization based on the application layer services.

It can be noted that two sided preferential attachment may make the network unstable. Therefore it is desirable to provide a limiting counter in the system (in each EED 10 and also in the ESC 20) to control the information which the EEDs broadcast and advertise (e.g., the number of their connections and their preference vectors). If there is an over emphasis on the advertisement it is possible that the network attachment process can be too fast and aggressive, potentially resulting in an instability in the network of EEDs 10. The control mechanism (e.g., a counter with some security mechanisms) is harmonized among the EEDs 10 and can be under the direction of a control node 50 shown in FIG. 1 in a manner similar to key nodes in the DNS (domain name servers) of the Internet. The control node 50 has the responsibility at least to adjust the control value in the counter of the EEDs 10 as needed in order to keep the network of EEDs stable. The control node 50 could be a dedicated node or it could be part of or co-located with one of the servers 20A, 30A or 40A.

The above described algorithms are now described in further detail in reference to FIG. 2. FIG. 2 shows an example of a portion of the ESC 20 and one of the servers 20A. The server 20A includes at least one data processor 22 and at least one memory 24 storing software 24A that implements the algorithms and other needed programs. The server 20A includes a wired or a wireless communication interface 26 configured to provide bi-directional communication between the ESC 20 and the various components and systems depicted in FIG. 1. The server 20A can also include or have access to a database (DB) 28 that stores data related to the various EEDs 10. This data can include a vectors list 28A that is broadcast/advertised by each EED 10.

As was noted previously the server could instead be resident elsewhere in the system, such as at the wireless network infrastructure as the server 30A, or at the local area system as the server 40A. The server could be resident in the EED 10 and thus be considered as a mobile cloud embodiment. This mobile cloud opportunity is useful when very local preferential attachment networks are built, e.g., in remote areas with limited or no wide area coverage. The functionality of the server 20A shown in FIG. 2 could also be distributed over two or more co-located or geographically distributed servers.

One algorithm 60 has the responsibility of calculating the preference of the EEDs 10. The preference algorithm 60 can, as a simple example, determine the preference value as a linear sum of the vectors stored in the associated vectors list 28A. Weights can be used for the vectors of the vectors list 28A. For example, the current location of the EED 10 can be weighted so as to have more importance than an indicated preferred language (if these happen to be the subset of vectors which have any correlation between a user's device and other devices which the user's device can see or hear). This can be seen as a modification of a preferential attachment algorithm where the preference is based solely on a number of connections that the currently available nodes have. Any of the above described vectors (and others as well) can be considered by the preference algorithm 60, in addition to the number of connections that other nodes advertise as having available.

The above-described user preference adjustment algorithm can form a part of the preference algorithm 60. The preference algorithm 60 may have additional learning functions included. The end user of the device may have a dedicated user interface function which aids the algorithm to learn which kind of preference vector elements seem to be valuable for the end user. This user interface function may be implemented as a dedicated "Like" key which the end user can use when some emergent behavior is executed by the device and the network. The "Like" key may be implemented as a physical button, as a softkey, or simply as a software button on the touch screen of the UI 19. By hitting the "Like" key the end user can give some information to the algorithm which then can modify the weights of the linear combination of the preference vector accordingly. A "Dislike" key or other user input can be provided as well that when activated can cause the weight modification to be changed in an opposite sense to activation of the "Like" input.

Note that the Like/Dislike function key (or other user input) could also be viewed as an Acknowledge/Not Acknowledge function key for emergent behavior. This functionality differs from the conventional Like/Dislike inputs in social networks, where a user activates a Like key based on a preference of the end user's behavior, in that the Like/Dislike function can be used to acknowledge the function(s) of the emergent network itself. Further in this regard weights associated with the preference algorithm 60 can be increased in value or decreased in value based on a user input indicative of a user's 'like' or 'dislike' of a function or functions associated with a manifested emergent behavior of the network of EEDs 10.

Note further in this regard that the other user input(s) could be based on, for example, face expression recognition in combination with a digital imaging device or, in general, any type of biometric-based information that can be used to estimate a user's preference or lack of preference for some activity of the emergent network.

Another algorithm 62 is one that seeks groups of EEDs 10. The groups algorithm 62 can operate in a relatively simple manner and can be based on a particular EED 10 scanning all available other nodes based on their vectors (e.g., considering parameters such as spatial closeness, common interests, and a combination of these and other parameters). This can be achieved by a particular EED 10 considering all of the available nodes. A more complex groups algorithm 62 causes the EED 10 to consider available nodes based on a highest value of a node vector or vectors matching a vector or vectors of interest to the particular EED 10. This can also be application dependent, e.g., by considering for a certain application (e.g., a game application) only those vectors of other EEDs 10 that are meaningful or important in the context of the game application (e.g., processor speed, user interface characteristics, whether another candidate EED 10 advertises the corresponding game as part of the Applications Vector, etc.). Various scanning methods can be used, such as executing multiple parallel scans, continuous scanning, scanning whenever the radio circuitry is on for any reason, etc.

The preference algorithm 60 may be considered as a subset or an element of a connection/disconnection algorithm 70. A related algorithm is thus a disconnection algorithm 64. Disconnection from a group of EEDs 10 can be triggered by an occurrence of any of a number of conditions. For example, if the EED 10 while scanning discovers a new group of EEDs 10 having higher preferential attachment values that the preferential attachment values of a current group of EEDs 10, the EED 10 can disconnect from the current group and attach (connect) to the newly discovered group. As was noted above it can be desirable to provide for some connection/disconnection hysteresis to avoid a ping-pong effect.

More advanced disconnection criteria can include, as a non-limiting example, a "free rider detect" criterion. In this case if a group of EEDs 10 detect that there is a passive EED 10 in the group that does not offer any service(s) and/or does not transport invitations from the other EEDs 10, the EEDs 10 of the group can exclude the passive EED 10. This can be accomplished, for example, after expiration of an 'inactivity' timer that is started when the EED 10 joins the group and that is reset whenever the EED 10 interacts in some way with the other members of the group. Expiration of the inactivity timer indicates that the associated EED 10 is or has become passive, and this condition can then trigger the disconnection of the passive EED 10. This type of operation can also be controlled by the software in the cloud (ESC 20). When the images of the fractal networks are stored in the cloud (ESC 20) it becomes possible for the cloud also to compute the activity of the EEDs 10. In some scenarios it can be easier and faster to compute such algorithms in the cloud (ESC 20). Preferably though, it is desirable that the overall system not be limited to be dependent on the support of the ESC 20 and therefore at least the automatic disconnection algorithm(s) can be provided in all EEDs 10. This provides support of the emergent functions also in an "offline" mode, such as in remote places or in special environments such as airplanes or ships which may not support good access to the ESC 20. In some scenarios the inactivity timers of each group are managed together which enables each group to have their own criteria for inactivity. Some groups may have a very short inactivity time out while some other groups may basically "live forever" from the inactivity perspective. The inactivity counter may not be activated in this latter case, or it may be initialized to some very large value.

Another disconnection criterion can be based on the behavior of a particular EED 10 within the group. In this case, and as a non-limiting example, if the behavior of the particular EED 10 is not consistent with the vectors advertised by the EED 10 it can be disconnected from the group. For example, if the particular EED 10 asserts that it is at some location but other information actually indicates that the EED is elsewhere the EED 10 can be disconnected from the group.

In these and other cases disconnecting a particular EED 10 can mean that the other EEDs 10 of the group simply ignore any transmissions from the particular EED, and each EED 10 of the group can decrement a counter that indicates the number of EEDs 10 to which they are connected (the value of which can be broadcast).

It is also possible that a particular EED 10 autonomously decides to leave (disconnect from) a certain group of EEDs. For example, this can occur when the number of groups to which the particular EED 10 exceeds some threshold value based on, for example, physical constraints of the EED 10 (e.g., memory capacity, battery charge state) and there is a newly discovered EED or EED network having a higher preferential attachment value (vector sum) while considering the hysteresis component. In this case the currently connected-to network of EEDs having the lowest preferential attachment value can be dropped (disconnected from).

It is pointed out that even one element in the vector lists either among device-specific or user-specific vectors can be basis for the decision to join a group or connect to a network of EEDs 10. The above-described weighting of vectors includes an option to have all weights but, as a minimum, one weight set to zero. In this non-limiting example the decision to join a group or connect to a network of EEDs 10 could be made based on a single vector component (a single vector element) only.

Further with regard to multiple vector lists, in order to join multiple groups the EED 10 can have, as an example, different weightings for different identities. Basically the weights can be considered to be in a matrix with multiple columns, and each column can have its own set of weights. Vector weight matrices can be stored in the DB 28 of FIG. 2. The end user may choose between the columns or this can be done automatically. This comports with the nature of fractal systems where there basically an unlimited number of nested functions.

In view of this it can be appreciated that an aspect of the exemplary embodiments of this invention is making a determination, in cooperation with a cloud-based data processing environment (ESC 20), whether to connect to a network of other EEDs 10 based at least on at least one element that comprises part of vector lists associated with the other EEDs, where the vector lists are stored at the cloud-based data processing environment.

The exemplary embodiments of this invention thus provide emergent services using a population of cooperating locally intelligent mobile agents in conjunction with a common data processing environment (ESC 20) where the mobile agents can make connections and obtain access to relevant information (e.g., vector values of other agents) and algorithms.

It should be noted that the 'cloud' may be or may include a local mobile agent cloud that supports only one mobile agent and its sensor network. This nested or fractal nature can be advantageous in a case where it is not possible that all sensor and other information goes directly to the centralized cloud (e.g., to the ESC 20). Scalability is thus also a feature of the overall system of EEDs 10 and ESC(s) 20. This aspect of the invention is also related to the above-described "off-line" mode of operation.

The various data processors, memories, data bases, programs, transceivers and interfaces depicted in FIGS. 1 and 2 can all be considered to represent means for performing operations and functions that implement the several non-limiting aspects and embodiments of this invention.

Advantages inherent in providing enhanced social and other types of networking in accordance with the exemplary embodiments of this invention include new services and increased value being provided to end users. Emergent or other groups that users (or sensors, etc.) form automatically can be used as a basis to provide services to the users. The services may be similar in each instance but in general they are never identical, as the services rely at least in part on the number of users involved in a certain network of EEDs 10 as well as on the identities and capabilities of the individual EEDs. This can be considered as a source controlled unpredictability and therefore also a source of optimum differentiation.

Based on the foregoing it should be apparent that the exemplary embodiments of this invention provide a method, apparatus and computer program(s) to provide cloud-based emergent behaviors in mobile devices and populations of mobile devices formed into networks or groups of mobile devices.

Figure 3:
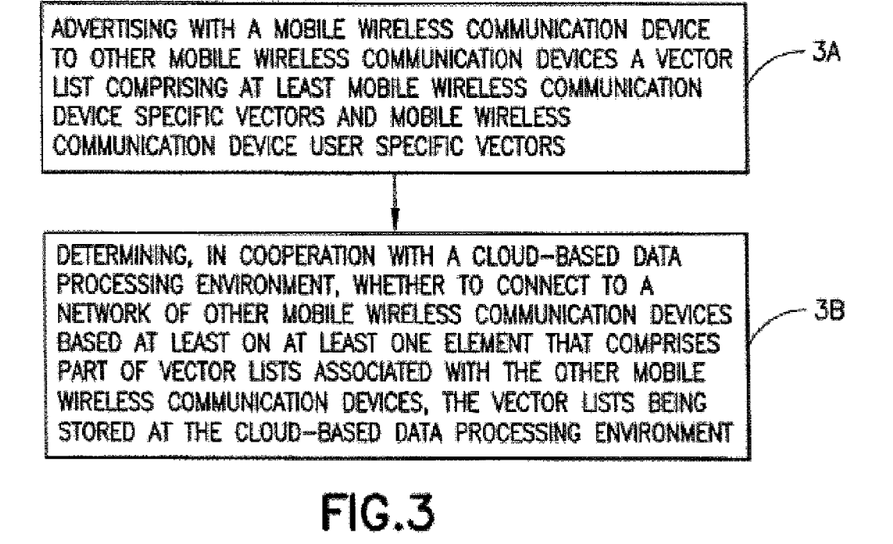
FIG. 3 is a logic flow diagram that illustrates the operation of a method, and a result of execution of computer program instructions, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs, at Block 3A, a step of advertising with a mobile wireless communication device to other mobile wireless communication devices a vector list comprising at least mobile wireless communication device specific vectors and mobile wireless communication device user specific vectors. The method further includes, at Block 3B, a step of determining, in cooperation with a cloud-based data processing environment, whether to connect to a network of other mobile wireless communication devices based at least on at least one element that comprises part of vector lists associated with the other mobile wireless communication devices, the vector lists being stored at the cloud-based data processing environment.

Figure 4:
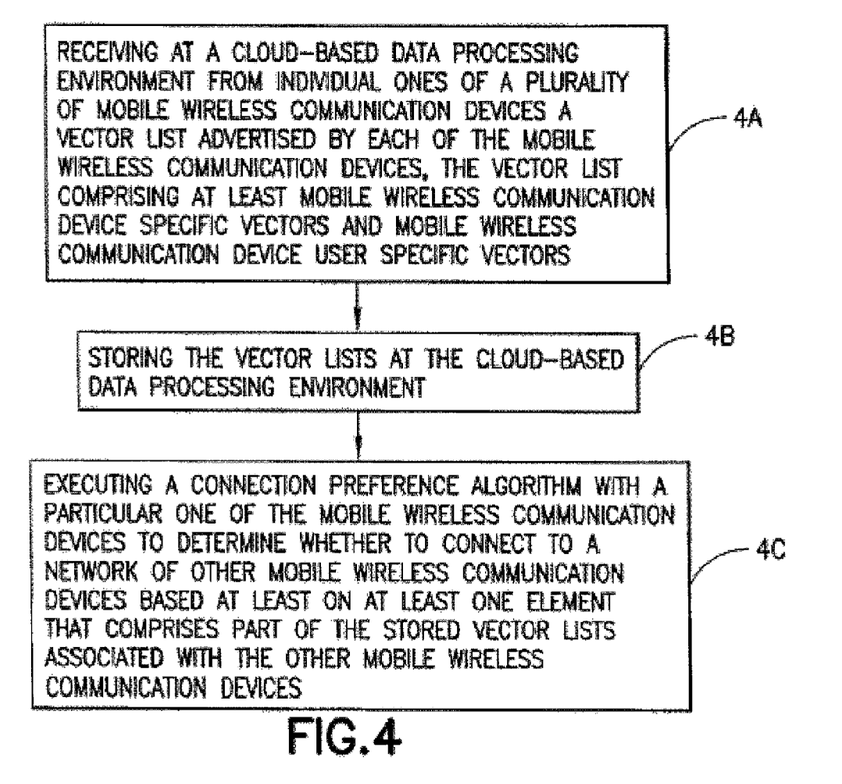
FIG. 4 is another logic flow diagram that illustrates the operation of a method, and a result of execution of computer program instructions, further in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of receiving at a cloud based data processing environment from individual ones of a plurality of mobile wireless communication devices a vector list advertised by each of the mobile wireless communication devices, the vector list comprising at least mobile wireless communication device specific vectors and mobile wireless communication device user specific vectors. At Block 4B there is a step of storing the vector lists at the cloud based data processing environment. At Block 4C there is a step of executing a connection preference algorithm with a particular one of the mobile wireless communication devices to determine whether to connect to a network of other mobile wireless communication devices based at least on at least one element that comprises part of the stored vector lists associated with the other mobile wireless communication devices.

In addition to the examples presented above, indications of cost factors may also be added to the FED vectors in the database 28 (e.g., and sent by the EED 10 to the infrastructure 30) as EED 10 specific vectors. These vectors are shown as "cost factor vectors" in FIG. 2. The cost factors in the vectors may include, as non-limiting examples, power consumption of an EED 10, memory usage by the EED 10, and processor load of the EED 10. These and many other similar issues have been taken into account as static requirements when networks have been developed, but no dynamic control of such cost factors has been applied.

Regardless, cost factors have dynamic, real time behavior which may be observed while an EED 10 is in use. This will enable the network (e.g., cloud implementation) to learn and improve its behavior automatically over time. With regard to the vectors described above, there may already be some vector elements that have dynamical behavior, but the cost oriented vector elements having the dynamical behavior further add to the EED vectors. Moreover, this information is then available for the cloud for learning and dynamic decision making.

Cost factors could be observed in many ways. For instance, instead of static power consumption optimization, the network should know the real time current consumption of the device (or remaining talk/data time, or battery charge available) in order to really learn the dynamic behavior. Similarly, memory consumption (or available remaining memory, both of which are indications of memory usage), processor load (or available mips, millions of instructions per second), or even remaining amount of money in a prepaid subscription could be used as dynamical information which can be used in the cloud to justify/optimize/learn in order to offer the best possible end user experience for each individual and as well as for the overall group of the users.

One may explicitly define new elements to the EED vectors that are proposed above in order to transfer and use the cost factors. Also the dynamical nature of these cost factor vectors and their vector elements may be defined. For instance, these vectors may have a timestamp incorporated therein, or may include other indications of the dynamical nature of the vector elements, or some sections of vectors could be reserved for dynamical cost factors (e.g., and therefore data within that section are defined as being dynamical).

Vectors may list, in an exemplary embodiment, at least some of those cost factor elements mentioned above, including as non-limiting examples one of more of the following: (real time) current consumption, processor/memory load, money spent (e.g., in case of volume based charging). Similar elements may also include user TX (transmit) power (which is not necessarily available for the cloud part of the network, even if this power is available for the base station), power levels used downstream (e.g., recorded by a sensor network when available), and similarly the above mentioned elements from each sensor. The fractal nature of the network should be considered. Any dynamic cost factor of any network device or function should be considered. Potentially even the measured activity level of the end user could be one of those cost factors. This could be used also to protect the end user for mental overload in case of driving the car and trying to use the device at the same time. Any sensor data may be seen also as "cost factor" in this sense. Not all such pieces of information are listed here.

Further, the additional vector elements of cost factors are different from the previously described vector elements in the sense that these factors are dynamically changing variables that relate to a cost of being associated with (or potentially connecting to) a particular ad hoc network. The previously described vector elements listed mostly positive value factors such as user preferences. Thus, the cost factors may be thought of, in an exemplary embodiment, as "negative" factors as these factors imply a cost associated with connecting to or maintaining a connection with an ad hoc network. The previously described "value" vector elements, in this exemplary embodiment, may be thought of as "positive" factors associated with connecting to or maintaining a connection with the ad hoc network. The negative and positive factors may be taken into account in any of the algorithms described above, e.g., as positive and negative degrees of freedom.

There are multiple algorithms that could be used to process the information in the vectors, some of which have been previously described and may be extended to EED vectors, end user vectors, and cost factor vectors.

One example starting point algorithm is a linear sum of all the positive and negative factors in the vectors. Such a linear sum is described above. The centralized cloud (e.g., server 20) can see all the vectors of all the devices and can perform also group decision making. Each device (e.g., EED 10) can see vectors of all the available clouds (or has accesses to different clouds) and can choose the cloud (or subset of a cloud) to which the device wants to be connected.

Additional exemplary algorithms beyond the linear sum algorithms that may be used include the following non-limiting examples:

1. A linear sum with weights on each vector component, which can be adjustable by either the end user or cloud (e.g., while seeking more devices which would prefer this particular cloud).
2. A linear sum of nonlinear/adapting weights, i.e., weights that increase when the device/cloud observes correlation. This is similar to a neural system of people, e.g., the importance of the location vector is even higher when there are many devices in the proximity. This can be considered a "rich get richer" approach.
3. A nonlinear sum of weights, i.e., where importance of the power consumption is impacted by importance of the social preferences of the end users.
4. A nonlinear sum of nonlinear weights, e.g., a combination of 1, 2 and 3.

Overall, an important factor is that the positive correlation of the observed vectors and local vectors increases the value of the local vectors or the individual factors of the vectors. Random observations, i.e., no correlation, should be considered as noise. Negative correlation could be used as well.

There should be also some maximum values set in order to avoid system saturation, as well as time dependent decay values set for the vector components in order those to return to default values over time.

It is noted that typical scenarios will consider both value factors and cost factors in the algorithms described above. It may be that the preferential attachment to a particular ad hoc network is dependant, e.g., on the remaining battery charge or available memory, along with the value factors. That is, the algorithms above may choose to disconnect from a particular ad hoc network based on a low amount of battery charge or a low amount of available memory in addition to value factors. As a further example, the choice of two different groups or two ad hoc networks may be made using the cost factors and value factors. However, it is also possible that a cost factor may override value factors and thus only cost factor(s) could be considered in the algorithms. For instance, if battery power is very low (e.g., meeting some predetermined criterion) for a particular EED 10, a decision could be made, e.g., regardless of value factors, not to connect to or to disconnect from an ad hoc network.

Figure 5:
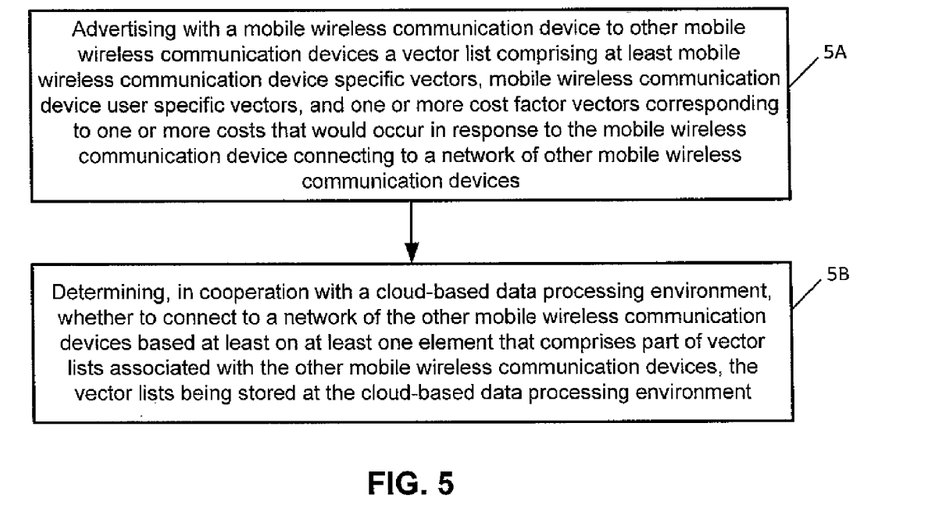
FIG. 5 is a logic flow diagram that illustrates the operation of a method, and a result of execution of computer program instructions, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, an operation is performed of advertising with a mobile wireless communication device to other mobile wireless communication devices a vector list comprising at least mobile wireless communication device specific vectors, mobile wireless communication device user specific vectors, and one or more cost factor vectors corresponding to one or more costs that would occur in response to the mobile wireless communication device connecting to a network of other mobile wireless communication devices. In Block 5B, an operation is performed of determining, in cooperation with a cloud-based data processing environment, whether to connect to a network of the other mobile wireless communication devices based at least on at least one element that comprises part of vector lists associated with the other mobile wireless communication devices, the vector lists being stored at the cloud-based data processing environment.

Figure 6:
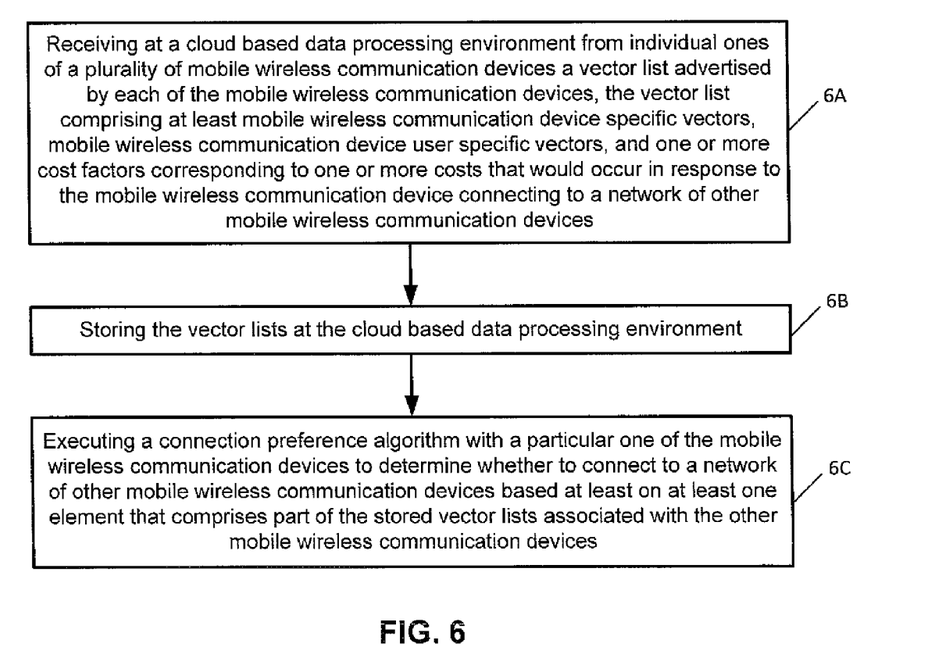
FIG. 6 is a logic flow diagram that illustrates the operation of a method, and a result of execution of computer program instructions, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, an operation is performed of receiving at a cloud based data processing environment from individual ones of a plurality of mobile wireless communication devices a vector list advertised by each of the mobile wireless communication devices. The vector list comprises at least mobile wireless communication device specific vectors, mobile wireless communication device user specific vectors, and one or more cost factors corresponding to one or more costs that would occur in response to the mobile wireless communication device connecting to a network of other mobile wireless communication devices. In Block 6B, an operation is performed of storing the vector lists at the cloud based data processing environment. In Block 6C, an operation is performed of executing a connection preference algorithm with a particular one of the mobile wireless communication devices to determine whether to connect to a network of other mobile wireless communication devices based at least on at least one element that comprises part of the stored vector lists associated with the other mobile wireless communication devices.

The various blocks shown in FIGS. 3, 4, 5, and 6 may be viewed as method steps, and/or as operations that result from operation of computer program code, and/or as a plurality of coupled logic circuit elements constructed to carry out the associated function(s).

As such, an aspect of the exemplary embodiments of this invention is an apparatus that comprises at least one data processor and at least one memory that includes computer program code. The at least one memory and computer program code are configured, with the at least one data processor, to cause the apparatus at least to advertise with a mobile wireless communication device to other mobile wireless communication devices a vector list comprising at least mobile wireless communication device specific vectors and mobile wireless communication device user specific vectors; and to determine, in cooperation with a cloud-based data processing environment, whether to connect to a network of other mobile wireless communication devices based at least on vector lists associated with the other mobile wireless communication devices, the vector lists being stored at the cloud-based data processing environment.

A further aspect of the exemplary embodiments of this invention is another apparatus that comprises at least one data processor and at least one memory that includes computer program code. The at least one memory and computer program code are configured, with the at least one data processor, to cause the apparatus at least to receive at a cloud based data processing environment from individual ones of a plurality of mobile wireless communication devices a vector list advertised by each of the mobile wireless communication devices. The vector list comprises at least mobile wireless communication device specific vectors and mobile wireless communication device user specific vectors. The at least one memory and computer program code are configured, with the at least one data processor, to further cause the apparatus to store the vector lists at the cloud based data processing environment, and to execute a connection preference algorithm with a particular one of the mobile wireless communication devices to determine whether to connect to a network of other mobile wireless communication devices based at least on the stored vector lists associated with the other mobile wireless communication devices.

The exemplary embodiments of this invention further include an apparatus that comprises means for advertising with a mobile wireless communication device to other mobile wireless communication devices a vector list comprising at least mobile wireless communication device specific vectors and mobile wireless communication device user specific vectors. The apparatus is further comprised of means for determining, in cooperation with a cloud-based data processing environment, whether to connect to a network of other mobile wireless communication devices based at least on vector lists associated with the other mobile wireless communication devices, the vector lists being stored at the cloud-based data processing environment.

The exemplary embodiments of this invention further encompass an apparatus that comprises means for receiving at a cloud based data processing environment from individual ones of a plurality of mobile wireless communication devices a vector list advertised by each of the mobile wireless communication devices, where the vector list comprises at least mobile wireless communication device specific vectors and mobile wireless communication device user specific vectors. The apparatus further comprises means for storing the vector lists at the cloud based data processing environment, and means for executing a connection preference algorithm with a particular one of the mobile wireless communication devices to determine whether to connect to a network of other mobile wireless communication devices based at least on the stored vector lists associated with the other mobile wireless communication devices.

A further exemplary embodiment includes a method (or apparatus or program product) where the cloud-based data processing environment includes a disconnection algorithm that determines whether the mobile wireless communication device severs an established connection with the other mobile wireless communication devices. Another example includes the method (or apparatus or program product) where one or more of the other mobile wireless communication devices with which the mobile wireless communication device is connected as a network autonomously sever an established connection with the mobile wireless communication device thereby excluding the mobile wireless communication device from membership in the network, and where at least one criterion for severing an established connection is that a behavior of the mobile wireless communication device is not consistent with vectors advertised by the mobile wireless communication device, and where at least one other criterion for severing an established connection is that the mobile wireless communication device has become inactive within network for longer than some threshold period of time. In another example, the disconnection algorithm comprises a variable time hysteresis parameter that prevents ping-pang connection-disconnection of the mobile wireless communication device to a network. In a further example, a method (or apparatus) inhibits at least for a period of time a strongly connected mobile wireless communication device from disconnecting from the network.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above at least partially in the context of the LTE, GSM and IEEE 802 systems, it should be appreciated that the exemplary embodiments of this invention are not limited for use with only these particular types of wireless communication system.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, vectors and algorithms are not intended to be limiting in any respect, as these parameters, vectors and algorithms can be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   advertising with a mobile wireless communication device to other mobile wireless communication devices a vector list comprising at least mobile wireless communication device specific vectors and mobile wireless communication device user specific vectors; and
   determining, in cooperation with a cloud-based data processing environment, whether to connect to a network of other mobile wireless communication devices based at least on at least one element that comprises part of vector lists associated with the other mobile wireless communication devices, the vector lists being stored at the cloud-based data processing environment and each stored vector list comprises at least mobile wireless communication device specific vectors and mobile wireless communication device user specific vectors;

where the cloud-based data processing environment includes a preference algorithm that, in combination with a determination of a number of connections that other mobile wireless communication devices have, determines whether the mobile wireless communication device establishes a connection with the other mobile wireless communication devices;

where the preference algorithm determines a preference value as a linear sum of vectors stored in the associated vectors lists; and where at least some of the vectors are weighted when determining the preference value, and where weights are increased in value or decreased in value based on a user input indicative of a user's like or dislike of a function or functions associated with an emergent behavior of the network.

2. The method of claim 1, wherein the associated vector lists further comprise one or more cost factor vectors corresponding to one or more costs that would occur in response to the mobile wireless communication device connecting to a network of other mobile wireless communication devices.

3. The method of claim 2, wherein the mobile wireless communication device specific vectors and the mobile wireless communication device user specific vectors are considered to be value vectors, and wherein the determining further comprises determining, in cooperation with the cloud-based data processing environment, whether to connect to the network based on a plurality of elements that comprise part of the associated vector lists, and wherein the plurality of elements comprise one or more value vectors and one or more cost factor vectors.

4. The method of claim 2, wherein the one or more cost factors comprises one or more of the following: power consumption of the mobile wireless communication device, memory usage by the mobile wireless communication device, processor load of the mobile wireless communication device, current consumption of the mobile wireless communication device, remaining amount of money in a prepaid subscription for a user of the mobile wireless communication device, transmit power of the mobile wireless communication device, or measured activity level of the user using the mobile wireless communication device.

5. The method of claim 1, where the mobile wireless communication device specific vectors comprise at least one of a location vector specifying a location of the mobile wireless communication device, a time vector specifying a time related parameter of the mobile wireless communication device, a communication vector specifying at least one wireless communication parameter of the mobile wireless communication device, a device vector specifying characteristics of the mobile wireless communication device, and an applications vector specifying applications supported by the mobile wireless communication device.

6. The method of claim 1, where the mobile wireless communication device user specific vectors comprise at least one of a multi-valued privacy vector, a multi-valued security vector, a multi-valued affiliation vector and a user personality vector.

7. The method of claim 1, where the mobile wireless communication device operates as a master towards less-connected mobile wireless communication devices and as a slave towards more-connected mobile wireless communication devices.

8. The method of claim 1, where the preference algorithm determines a preference value based on vectors stored in associated vectors lists and on at least a first derivative of at least one of the vectors.

9. The method of claim 1, where the cloud-based data processing environment includes a disconnection algorithm that determines whether the mobile wireless communication device severs an established connection with the other mobile wireless communication devices.

10. The method of claim 1, further comprising determining, in cooperation with the cloud-based data processing environment, whether to connect to a network comprised of two or more networks of other mobile wireless communication devices.

11. A non-transitory computer-readable medium that contains software program instructions, where execution of the software program instructions by at least one data processor results in performance of operations that comprise execution of the method of claim 1.

12. An apparatus, comprising:
at least one data processor; and
at least one memory including computer program code, where the at least one memory and computer program code are configured, with the at least one data processor, to cause the apparatus at least to advertise with a mobile wireless communication device to other mobile wireless communication devices a vector list comprising at least mobile wireless communication device specific vectors and mobile wireless communication device user specific vectors; and to determine, in cooperation with a cloud-based data processing environment, whether to connect to a network of other mobile wireless communication devices based at least on at least one element that comprises part of vector lists associated with the other mobile wireless communication devices, the vector lists being stored at the cloud-based data processing environment and each stored vector list comprises at least mobile wireless communication device specific vectors and mobile wireless communication device user specific vectors;

where the cloud-based data processing environment includes a preference algorithm that, in combination with a determination of a number of connections that other mobile wireless communication devices have, determines whether the mobile wireless communication device establishes a connection with the other mobile wireless communication devices;

where the preference algorithm determines a preference value as a linear sum of vectors stored in the associated vectors lists; and where at least some of the vectors are weighted when determining the preference value, and where weights are increased in value or decreased in value based on a user input indicative of a user's like or dislike of a function or functions associated with an emergent behavior of the network.

13. The apparatus of claim 12, wherein the associated vector lists further comprise one or more cost factor vectors corresponding to one or more costs that would occur in response to the mobile wireless communication device connecting to a network of other mobile wireless communication devices, and wherein the one or more cost factors comprises one or more of the following: power consumption of the mobile wireless communication device, memory usage by the mobile wireless communication device, processor load of the mobile wireless communication device, current consumption of the mobile wireless communication device, remaining amount of money in a prepaid subscription for a user of the mobile wireless communication device, transmit power of the mobile wireless communication device, or measured activity level of the user using the mobile wireless communication device.

14. The apparatus of claim 13, wherein the mobile wireless communication device specific vectors and the mobile wireless communication device user specific vectors are considered to be value vectors, and wherein to determine further comprises to determine, in cooperation with the cloud-based data processing environment, whether to connect to the network based on a plurality of elements that comprise part of the associated vector lists, and wherein the plurality of elements comprise one or more value vectors and one or more cost factor vectors.

15. The apparatus of claim 12, where the mobile wireless communication device specific vectors comprise at least one of a multi-valued privacy vector, a multi-valued security vector, a multi-valued affiliation vector and a user personality vector, a location vector specifying a location of the mobile wireless communication device, a time vector specifying a time related parameter of the mobile wireless communication device, a communication vector specifying at least one wireless communication parameter of the mobile wireless communication device, a device vector specifying characteristics of the mobile wireless communication device, and an applications vector specifying applications supported by the mobile wireless communication device.

\* \* \* \* \*